No. 854,800.  
PATENTED MAY 28, 1907.  
H. M. CHEEK & C. P. BROOKS.  
NUT LOCK.  
APPLICATION FILED JUNE 2, 1906.
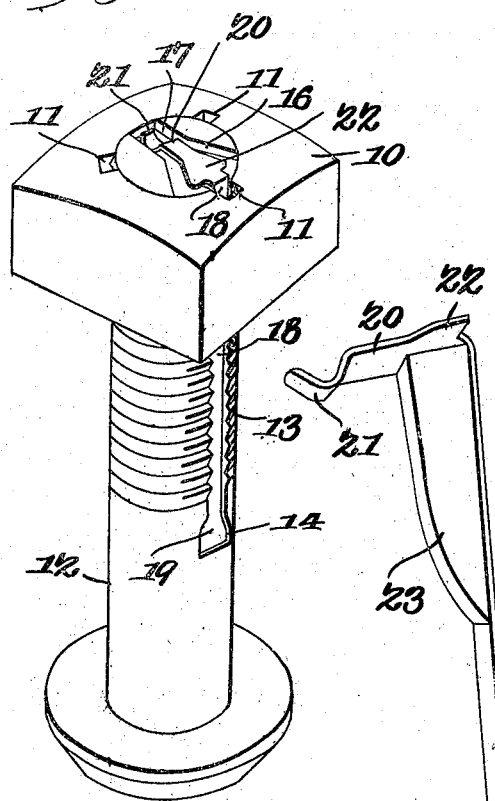
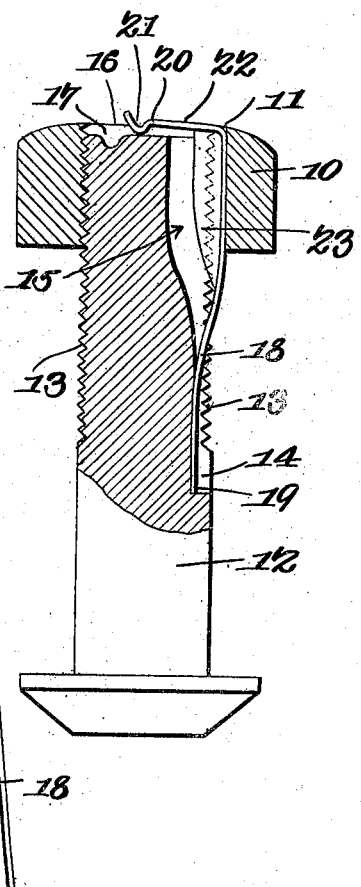
Witnesses:  
Henry M. Cheek  
Charles P. Brooks  
Inventors  
By  
Attorneys

UNITED STATES PATENT OFFICE.

HENRY M. CHEEK AND CHARLES P. BROOKS, OF PLEASANT PLAINS, ARKANSAS.

NUT-LOCK.

No. 804,800.

Specification of Letters Patent.

Patented May 28, 1907.

Application filed June 2, 1906. Serial No. 319,866.

*To all whom it may concern:*

Be it known that we, HENRY M. CHEEK and CHARLES P. BROOKS, citizens of the United States, residing at Pleasant Plains, in the county of Independence and State of Arkansas, have invented a new and useful Nut-Lock, of which the following is a specification.

This invention relates to nut locks, and has for its object to improve the construction and increase the efficiency and utility of devices of this character.

With these and other objects in view which will appear as the nature of the invention is better understood, the invention consists in certain novel features of construction as hereafter fully described and claimed.

In the accompanying drawings forming a part of this specification and in which corresponding parts are denoted by like designating characters, is illustrated the preferred form of the embodiment of the invention capable of carrying the same into practical operation.

In the drawings:—Figure 1 is a perspective view of the improved device with the locking latch withdrawn to permit the removal of the nut. Fig. 2 is a sectional view with the locking device in projected position. Fig. 3 is a perspective view enlarged of the spring latch, detached.

The nut 10 is provided with one or more grooves 11 transversely of its threads, and the bolt 12 is provided with a longitudinal channel 13, extended laterally as at 14 at the inner end and deepened into a recess 15 at the outer portion. The channel is also extended across the outer end of the bolt as at 16 and widened laterally and with a depression 17 spaced from the recess portion.

A spring latch 18 is seated in the channel 13 and formed with laterally extended inner end 19 to engage the lateral extension 14 of the channel, and also extended transversely at the outer end as at 20 for bearing within the widened end extension 16. The terminal 21 of the extension 20 is depressed to yieldably engage the depression 17, and the extension portion 20 is also extended laterally into wings 22 to enter the widened portion of the end recess 16 and form a closure and protection to the recess portion 15. Projecting from the latch 18 is a lug 23 bearing within the recess 15.

By this arrangement when the depression 21 of the latch is engaged with the depression 17 of the bolt the latch will be held within its channel and the lug 23 within the recess portion 15, and out of engagement with the grooves 11 in the nut, so that the latter may be freely rotated upon the bolt.

When the nut is set "home" it is adjusted to bring one of its grooves 11 opposite the channel 13, then by releasing the depression 21 the spring latch will engage the groove in the nut and lock the nut to the bolt, the lug 23 at the same time extending partly into the groove in the nut and partly into the recess in the bolt and forming thereby a broad surfaced and effectual locking key between the parts, and materially strengthening the coupling means, and relieving the relatively thin spring latch largely from lateral strains.

The laterally extending wings 22 project over the outer end of the recess portion, and protect the latter from mud, other foreign material.

The laterally extended end 19 of the latch firmly supports the latter and prevents longitudinal displacement, and obviates the necessity for other fastening means.

The device is simple in construction, can be inexpensively manufactured and applied to any size of bolt, or bolts employed for any purpose.

Having thus described the invention what is claimed is:—

1. In a nut lock, a bolt having a longitudinal groove transversely of its threads, and also having a recess in its outer end communicating at one end with said groove, the inner end of said recess being depressed and the outer end of said recess being widened, a spring latch engaging said groove and with a lateral bend engaging said recess and widened to bear in the widened portion of the same, a lug depending from said laterally bent portion of the latch and adapted to engage the depression in said recess when the latch is in withdrawn position, and a nut having grooves transversely of its threads and adapted to receive said latch when the lug is released from the depression.

2. In a nut lock, a bolt having a channel longitudinally of its stock and transversely of its threads and deepened at the outer portion and the bolt also having a recess in its outer end in communication with the channel and a depression at the inner end of the recess, a spring latch engaging said channel and provided with a stop rib bearing in the deepened portion of the same and with a lateral bend engaging said recess and terminating in a lug for engaging the depression in said recess, and a nut having grooves transversely of its threads and adapted to receive said latch when the lug is released from the depression.

3. In a nut lock, the nut having grooves transversely of its threads and the bolt having a longitudinal channel deepened into a recess at the outer portion, and extended across the end of the bolt, said end extension having a depression spaced from the recess portion, and a spring latch engaging said channel and extended at the outer end for bearing in the end extension of the channel and with laterally extending wings forming closures to said recess portion and with a terminal depression for yieldably engaging the depression in said end extension of the channel and a lug extending from said latch and bearing in said recess portion.

4. In a nut lock, the nut having grooves transversely of its threads and the bolt having a longitudinal channel extended laterally at the inner end and deepened into a recess at the outer portion and extended across the end of the bolt, said end extension having a depression spaced from the recess portion, and a spring latch engaging said channel and extended laterally at the inner end to engage the lateral extension of the channel and likewise extended at the outer end for bearing in said end extension of the channel and with a terminal depression for yieldably engaging the depression in the same, and with lateral wings forming a closure to said recess portion, and a lug carried by said latch and bearing in said recess.

5. In a nut lock the nut having grooves transversely of its threads and the bolt having a longitudinal channel extended laterally at the inner end, and extended across the end of the bolt and with a depression spaced from said recess portion, and a spring latch engaging said channel and extended laterally at the inner end to engage the lateral extension of the channel and likewise extended at the outer end for bearing in said end extension and with a terminal depression for yieldably engaging the depression therein.

In testimony that we claim the foregoing as our own, we have hereto affixed our signatures in the presence of two witnesses.

HENRY M. CHEEK.
CHARLES P. BROOKS.

Witnesses:
EDNA M. VICK,
S. C. VICK.